United States Patent [19]
Horikawa et al.

[11] Patent Number: 6,043,831
[45] Date of Patent: *Mar. 28, 2000

[54] ELECTROSTATIC RECORDING HEAD PROVIDING VOLTAGE REGULATION TO VOLTAGE APPLIED TO NEEDLE ELECTRODES

[75] Inventors: Takashi Horikawa, Sagamihara, Japan; Dennis Kauffman, Mountain View, Calif.; Tetsuo Itagaki, Sagamihara, Japan

[73] Assignee: Nippon Steel Corporation, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/845,885

[22] Filed: Apr. 28, 1997

Related U.S. Application Data

[63] Continuation of application No. 08/238,666, May 5, 1994.
[51] Int. Cl.[7] .................................................. B41J 2/40
[52] U.S. Cl. ............................................................ 347/142
[58] Field of Search ................................. 347/145, 142, 347/147; 346/139 C

[56] References Cited

U.S. PATENT DOCUMENTS

| | | | |
|---|---|---|---|
| 3,814,516 | 6/1974 | Whited | 355/3 DD |
| 5,053,793 | 10/1991 | White et al. | 347/145 |
| 5,061,948 | 10/1991 | Hansen et al. | 347/145 |
| 5,270,729 | 12/1993 | Stearns . | |
| 5,515,095 | 5/1996 | Matsuda et al. . | |

FOREIGN PATENT DOCUMENTS 06344589  12/1994  Japan .

*Primary Examiner*—John Barlow
*Assistant Examiner*—Raquel Yvette Gordon
*Attorney, Agent, or Firm*—Pollock, Vande Sande & Amernick

[57] ABSTRACT

There is provided an electrostatic recording head capable of moderating variable density striations generated on a recording blank form. In an applied voltage regulating unit, a closed circuit is formed by connecting a regulator (42), a resistor (32), a diode (34) and a resistance ($R_1$) and a transistor ($T_1$) provided in a driving circuit (16 or 18) in series in one needle electrode (12). Here, a cathode side of the diode (34) is connected to the needle electrode (12), and another end of the regulator (42) is connected to the driving circuit (16 or 18). A regulated voltage determining means (44) determines the voltage to be applied to each needle electrode (12) in accordance with the picture image density detected by a picture image density detecting unit (46) and the humidity detected by a humidity sensor (48), and regulates a voltage value of a regulator (42) based on the determined voltage. Thus, the voltage applied to the needle electrode (12) can be regulated by applying an electric current to the circuit and dropping the voltage with resistance 32 and resistance $R_1$.

16 Claims, 4 Drawing Sheets

| PICTURE IMAGE DENSITY | CORRECTION VALUE OF REGULATED VOLTAGE |
|---|---|
| 1/8 | 7.5 |
| 2/8 | 7.5 |
| 3/8 | 10.0 |
| 4/8 | 12.5 |
| 5/8 | 15.0 |
| 6/8 | 15.0 |
| 7/8 | 17.5 |
| 8/8 | 20.0 |

*FIG. 4*

| PICTURE IMAGE DENSITY | CORRECTION VALUE OF REGULATED VOLTAGE (50 % R H) | CORRECTION VALUE OF REGULATED VOLTAGE (30 % R H) | CORRECTION VALUE OF REGULATED VOLTAGE (60 % R H) |
|---|---|---|---|
| 1/8 | 7.5 | 7.5 | 2.5 |
| 2/8 | 7.5 | 7.5 | 5.0 |
| 3/8 | 10.0 | 10.0 | 7.5 |
| 4/8 | 12.5 | 12.5 | 7.5 |
| 5/8 | 15.0 | 15.0 | 10.0 |
| 6/8 | 15.0 | 15.0 | 12.5 |
| 7/8 | 17.5 | 17.5 | 15.0 |
| 8/8 | 20.0 | 20.0 | 15.0 |

*FIG. 5*

| NO. | BASIC PATTERN | PICTURE IMAGE DENSITY |
|---|---|---|
| 1. | 00000001 | 1/8 |
| 2. | 00000011 | 2/8 |
| 3. | 00000101 | 2/8 |
| 4. | 00001001 | 2/8 |
| 5. | 00010001 | 2/8 |
| 6. | 00000111 | 3/8 |
| 7. | 00001011 | 3/8 |
| 8. | 00010011 | 3/8 |
| 9. | 00010101 | 3/8 |
| 10. | 00100101 | 3/8 |
| 11. | 00001111 | 4/8 |
| 12. | 00010111 | 4/8 |
| 13. | 00100111 | 4/8 |
| 14. | 00011011 | 4/8 |
| 15. | 00101011 | 4/8 |
| 16. | 00101101 | 4/8 |
| 17. | 00110011 | 4/8 |
| 18. | 01010101 | 4/8 |
| 19. | 00011111 | 5/8 |
| 20. | 00101111 | 5/8 |
| 21. | 00110111 | 5/8 |
| 22. | 01010111 | 5/8 |
| 23. | 01011011 | 5/8 |
| 24. | 00111111 | 6/8 |
| 25. | 01011111 | 6/8 |
| 26. | 01101111 | 6/8 |
| 27. | 01110111 | 6/8 |
| 28. | 01111111 | 7/8 |
| 29. | 11111111 | 8/8 |

*FIG. 6*

ELECTROSTATIC RECORDING HEAD PROVIDING VOLTAGE REGULATION TO VOLTAGE APPLIED TO NEEDLE ELECTRODES

This application is a continuation of U.S. patent application Ser. No. 08/238,666, filed May 5, 1994.

BACKGROUND OF THE INVENTION

1. Field of the Invention

The present invention relates to an electrostatic recording head used in an electrostatic plotter or the like.

2. Description of the Related Art

A conventional electrostatic recording head has a plurality of needle electrodes arranged in an almost perpendicular direction to a direction of feeding a recording blank form and a plurality of auxiliary electrodes arranged in the vicinity of the needle electrodes. The plurality of needle electrodes are divided into a plurality of groups, and the needle electrodes in respective groups are arranged so as to oppose to two auxiliary electrodes. Then, an electrostatic latent image of one line portion is formed by performing such an action that discharge is generated by applying constant voltage (e.g., −300 V) selectively to respective needle electrodes in one group and also applying constant voltage (e.g., +300 V) to the auxiliary electrodes corresponding to the needle electrodes successively with respect to the needle electrodes of respective groups.

Now, it is generally known that variable density striations are generated parallel to the direction of feeding a recording blank form when a picture image smeared out black on the whole surface for instance is outputted in the electrostatic recording head of a multiplex system described above. Various causes such as that polarization is produced in a dielectric layer of the recording blank form by applying voltage to the auxiliary electrodes and space distribution of an electric field becomes uneven when voltage is applied again to the auxiliary electrodes before the polarization is moderated, that a large capacity is produced at an end portion of the group since the needle electrodes are arranged densely, and further that the space distribution of the electric field becomes uneven remarkably at the end portions of the groups when voltage is applied to almost all the needle electrodes included in the group may be cited for the above. Moreover, the generation of such variable density striations is also affected not a little by humidity, temperature, nature of the recording blank form or the like. There are a large number of causes of generating variable density striations as described above. Therefore, it has been an important subject how such variable density striations are to be reduced in a conventional electrostatic recording head of a multiplex system.

SUMMARY OF THE INVENTION

The present invention has been made owing to circumstances described above, and has for its object to provide an electrostatic recording head capable of moderating variable density striations generated on a recording blank form effectively.

In order to achieve the above-mentioned object, the present invention comprises an applied voltage regulating means for regulating the voltage applied to the needle electrodes located at least at both end portions in respective groups in an electrostatic recording head which is provided with a plurality of needle electrodes arranged linearly and divided into a plurality of groups and a plurality of auxiliary electrodes arranged corresponding to the groups in the vicinity of the needle electrodes and forms an electrostatic latent image of one line portion on a recording medium by performing such an action that voltage is applied in one group to the auxiliary electrodes corresponding to that group and voltage is also applied selectively to the needle electrodes based on a writing signal of picture image data successively with respect to respective groups.

Further, it is preferred that the applied voltage regulating means regulates the voltage applied to the needle electrodes by applying an electric current to a resistance provided in a circuit for applying the voltage to the needle electrodes so as to drop the voltage with the resistance.

Further, it is preferred that the applied voltage regulating means regulates the voltage applied to the needle electrodes so that a potential difference between the needle electrodes and the auxiliary electrodes corresponding thereto becomes smaller as getting nearer to both ends at both end portions of respective groups.

Further, it is preferred that the applied voltage regulating means regulates the voltage applied to the needle electrodes so that picture image data having a picture image density which becomes a predetermined reference are written in advance on a recording medium and variable density striations generated on the recording medium on which these picture image data are written are moderated.

Further, it is preferred that a picture image density detecting means for detecting the density of an outputted picture image is provided, and that the applied voltage regulating means regulates the voltage applied to the needle electrodes in accordance with the density of the picture image detected by the picture image density detecting means.

Furthermore, it may be arranged so that a humidity detecting means for detecting humidity is provided, and the applied voltage regulating means regulates the voltage applied to the needle electrodes in accordance with the humidity detected by the humidity detecting means.

Furthermore, it may be arranged so that a temperature detecting means for detecting temperature is provided, and the applied voltage regulating means regulates the voltage applied to the needle electrodes in accordance with the temperature detected by the temperature detecting means.

In addition, the applied voltage regulating means may also be one that regulates the voltage applied to the needle electrodes in accordance with electric characteristics of a recording medium.

According to the present invention, it becomes possible to regulate the voltage applied to respective needle electrodes individually so that, for example, the potential difference between the needle electrodes and the auxiliary electrodes corresponding thereto becomes smaller as getting nearer to both ends at the both end portions of respective groups by providing an applied voltage regulating means for regulating the voltage applied at least to the needle electrodes located at both end portions in respective groups by the structure described above. With this, since it is possible to form the space distribution of the electric field between the needle electrodes and the auxiliary electrodes almost even in respective groups, it is possible to moderate variable density striations generated on a recording medium effectively.

Further, for example, the applied voltage regulating means regulates the voltage applied to the needle electrodes by applying an electric current to a resistance provided in a circuit for applying the voltage to the needle electrodes so as to drop the voltage with the resistance. With this, it is possible to regulate the voltage applied to the needle electrodes with a simple structure.

Further, it is possible to moderate variable density striations surely by writing picture image data having picture image density which becomes a predetermined reference in advance on a recording medium and regulating the voltage applied to the needle electrodes so that the variable density striations generated on the recording medium on which these picture image data are written are moderated.

Further, since it is possible to regulate the voltage applied to the needle electrodes very finely corresponding to the change in the space distribution of the electric field owing to picture image data by regulating the voltage applied to the needle electrodes in accordance with the density of the outputted picture image, it is possible to moderate variable density striations generated on a recording medium more effectively.

Furthermore, it becomes possible to conduct regulation of the voltage applied to the needle electrodes with such a fact that the degree of variable density striations changes depending on humidity also taken into consideration by regulating the voltage applied to the needle electrodes in accordance with the humidity.

Furthermore, the regulation of the voltage applied to the needle electrodes with a fact that the degree of variable density striations changes depending on temperature also taken into consideration becomes possible by regulating the voltage applied to the needle electrodes in accordance with the temperature.

In addition, it is possible to regulate the voltage applied to the needle electrodes appropriately even when different types of recording media are used by regulating the voltage applied to the needle electrodes in accordance with electric characteristics of the recording media.

BRIEF DESCRIPTION OF THE DRAWINGS

FIG. 4 is a table showing correction values of regulated voltage for the picture image density in a needle electrode located at an end of a group;

FIG. 5 is a table showing correction values of regulated voltage for the picture image density in a needle electrode located at an end of a group when humidity is varied; and FIG. 6 is a table showing basic patterns of the writing signal having levels of respective picture image density.

DESCRIPTION OF THE PREFERRED EMBODIMENTS

Figure 1:
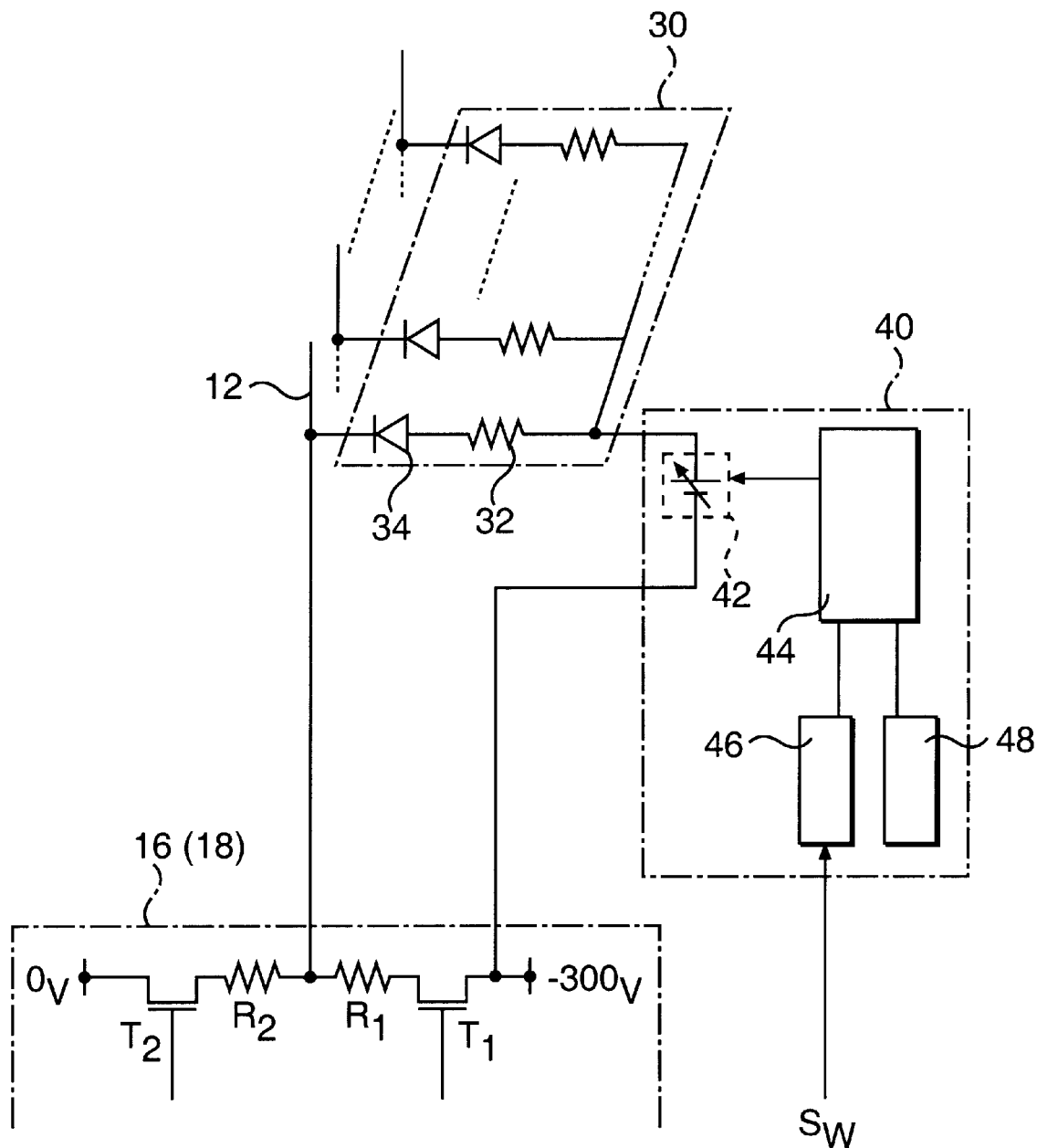
FIG. 1 is a schematic block diagram showing an embodiment of an electrostatic recording head of the present invention.

An embodiment of the present invention will be described hereinafter with reference to the drawings. FIG. 1 is a schematic block diagram showing an embodiment of an electrostatic recording head of the present invention, and FIG. 2 is a schematic block diagram of the whole electrostatic recording head.

Figure 2:
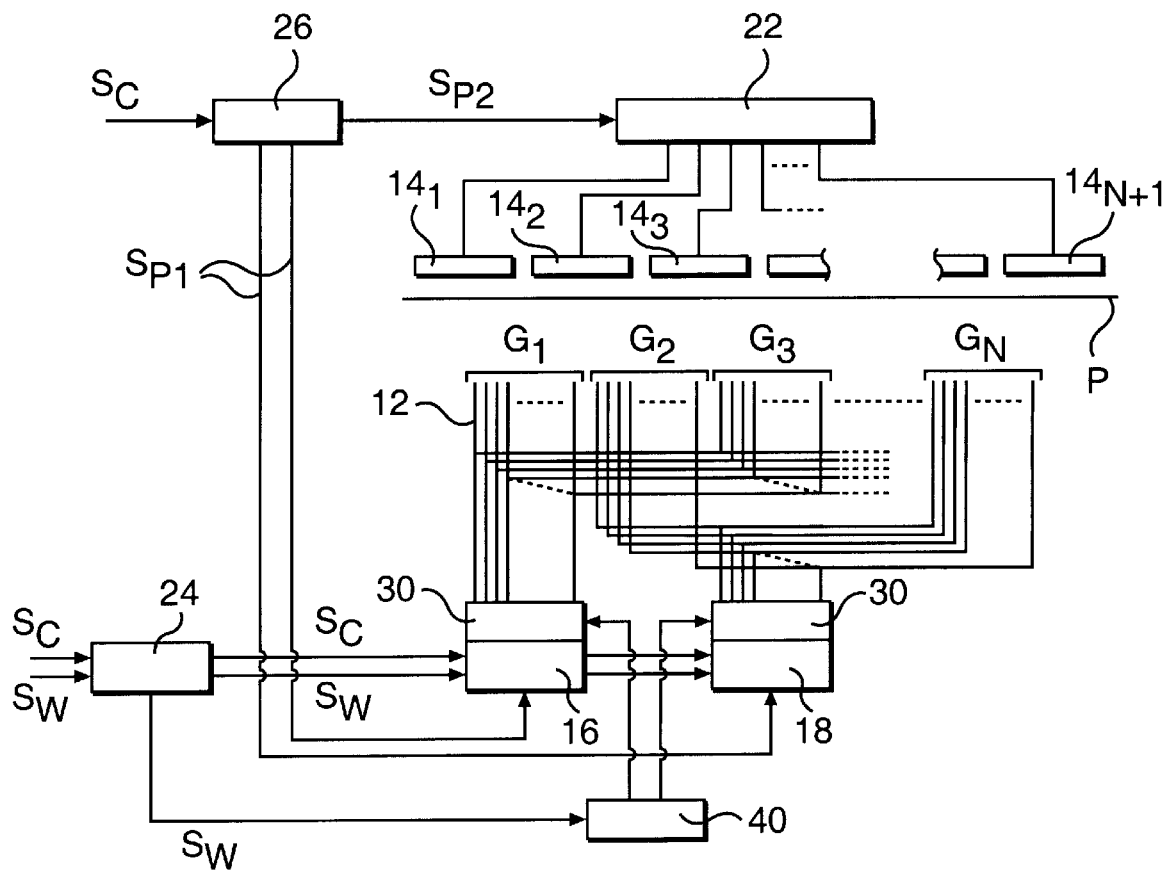
FIG. 2 is a schematic block diagram of the whole electrostatic recording head.

The electrostatic recording head shown in FIG. 2 is provided with a plurality of needle electrodes 12, a plurality of plate-formed auxiliary electrodes $14_1, 14_2, \ldots, 14_{n+1}$ (here, n is an even number), a first driving circuit 16, a second driving circuit 18, an auxiliary electrode driving circuit 22, a matrix circuit 24, a controller 26, applied voltage varying means 30, 30 as an applied voltage regulating means and a regulated voltage supply means 40.

The needle electrodes 12 are arranged in an almost perpendicular direction to a direction of feeding a recording blank form P (direction perpendicular to paper surface showing FIG. 2), and the plurality of auxiliary electrodes $14_1, 14_2, \ldots, 14_{n+1}$ are arranged on the opposite side of the needle electrodes 12 with the recording blank form P put therebetween. The plurality of needle electrodes 12 are divided into a plurality of groups $G_1, G_2, \ldots, G_n$ with 128 pieces as one group, and the groups $G_1, G_2, \ldots G_n$ and the auxiliary electrodes $14_1, 14_2, \ldots, 14_{n+1}$ are arranged while shifting them from one another by half. Namely, respective auxiliary electrodes $14_2, 14_3, \ldots, 14_n$ except the auxiliary electrodes $14_1$, and $14_{n+1}$ at both end portions are arranged oppositely to two groups. For example, the auxiliary electrodes $14_2$ opposes to the groups $G_1$ and $G_2$, and the auxiliary electrodes $14_3$ opposes to the groups $G_2$ and $G_3$.

Further, the needle electrodes 12 are connected in a matrix form for each odd-numbered group and each even-numbered group. Then, as to the needle electrodes 12, those that are included in odd-numbered groups $G_1, G_3, \ldots$ are connected to the first driving circuit 16, and those that are included in even-numbered groups $G_2, G_4, \ldots$ are connected to the second driving circuit 18, and the auxiliary electrodes $14_1, 14_2, \ldots, 14_{n+1}$ are connected to the auxiliary electrode driving circuit 22. The first driving circuit 16 and the second driving circuit 18 apply voltage (e.g., −300 V) to the needle electrodes 12, and the auxiliary electrode driving circuit 22 applies voltage having a polarity reverse to that of the needle electrodes (e.g., +300 V). The auxiliary electrodes $14_1, 14_2, \ldots, 14_{n+1}$ supplement voltage of a portion that the voltage applied to the needle electrodes 12 is short of discharge starting voltage, and discharge is not started until voltage is applied to both the needle electrodes 12 and the auxiliary electrodes corresponding thereto.

The matrix circuit 24 transmits a serial writing signal $S_W$ of the picture image data to respective driving circuits 16 and 18 and the regulated voltage supply means 40. The needle electrodes 12 applied with voltage are selected in one group by the writing signal $S_W$ that is transmitted to respective driving circuits 16 and 18. Further, a clock signal $S_C$ is also transmitted to respective driving circuits 16 and 18 from the matrix circuit 24, and a timing that respective driving circuits 16 and 18 receive the writing signal $S_W$ is obtained by the clock signal $S_C$.

The controller 26 transmits a writing pulse signal $S_{P1}$ for driving either the first driving circuit 16 or the second driving circuit 18 both connected to the needle electrodes 12 included in a predetermined group, and also transmits a writing pulse signal $S_{P2}$ for selectively driving two auxiliary electrodes corresponding to the group to the auxiliary electrode driving circuit 22. Further, the clock signal $S_C$ is inputted to the controller 26. By this clock signal $S_C$, the timing that the controller 26 drives the first driving circuit 16 or the second driving circuit 18 and the auxiliary electrode driving circuit 22 is obtained.

The applied voltage regulating means includes an applied voltage varying means 30, a regulated voltage supply means 40, and a resistance $R_1$ provided in the first driving circuit 16 and the second driving circuit 18 as shown in FIG. 1. Here, two sets of applied voltage varying means 30 are provided corresponding to the first driving circuit 16 and the second driving circuit 18 as shown in FIG. 2. The applied voltage regulating means regulates the voltage applied to the needle electrodes 12, thereby to moderate variable density striations generated in an output drawing in an electrostatic recording head of multiplex system.

The applied voltage varying means 30 includes resistances 32 each having a predetermined resistance value and diodes 34. They are provided for every 32 pieces of needle electrodes 12 that are located at both end portions of respective groups. The voltage applied to the needle electrodes 12 is regulated so as to apply desired regulated voltage to respective needle electrodes 12 by having the resistance value of each resistance 32 set to a predetermined value for each needle electrode 12 as described later.

Further, the regulated voltage supply means 40 includes a regulator 42 as a variable d.c. source, a regulated voltage determining means 44, a picture image density detecting means 46 and a humidity sensor 48. One set of regulated voltage supply means 40 is provided in common to two applied voltage regulating means 30, 30. The picture image density detecting means 46 detects the density of an outputted picture image, e.g., a rate of an ON signal to an OFF signal based on the writing signal $S_W$ of the picture image data. In the present embodiment, it is arranged to detect the picture image density (the rate of the ON signal to the whole signals) by dividing it into 9 levels of 0, 1/8, 2/8, . . . , 8/8. The humidity sensor 48 detects environmental humidity of the apparatus of the present invention. Further, the regulated voltage determining means 44 determines the regulated voltage to be applied to respective needle electrodes 12 so that variable density striations generated in the output drawing are moderated effectively in accordance with the picture image density detected by the picture image density detecting means 46 and the humidity detected by the humidity sensor 48, and the voltage value of the regulator 42 is set based on the determined regulated voltage.

In the applied voltage regulating means, a closed circuit is formed by connecting the regulator 42, the resistance 32, the diode 34, the resistance $R_1$ provided in the first driving circuit 16 (or the second driving circuit 18) and a transistor $T_1$ which is a switching element in series in one needle electrode 12. Here, the cathode side of the diode 34 is connected to the needle electrode 12, and another end of the regulator 42 is connected to the first driving circuit 16 (or the second driving circuit 18). Thus, if the voltage of the regulator 42 is set to a predetermined value when the needle electrode 12 is driven, an electric current is applied to the circuit mentioned above, and the voltage drops by the resistance 32 and the resistance $R_1$. Hence, desired regulated voltage is applied to the needle electrode 12 by the voltage drop.

Figure 3:
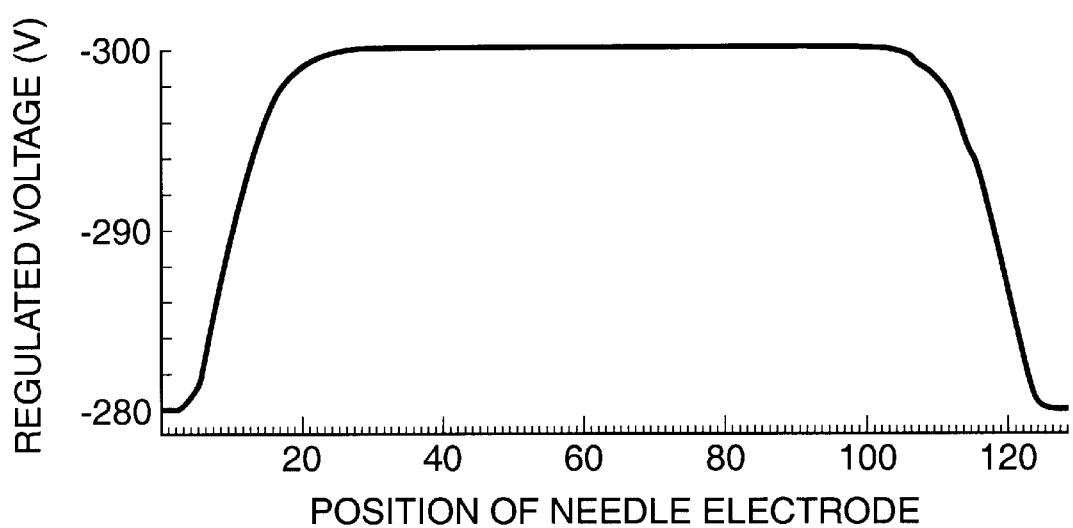
FIG. 3 is a diagram showing the relationship between the position of a needle electrode and regulated voltage when a level of a picture image density is 8/8.

Now, an example of a method of determining the regulated voltage will be described in the concrete. First, constant voltage at −300 is applied to the needle electrode 12 and constant voltage at +300 V is applied to the auxiliary electrode, thus outputting a picture image (having picture image density of 8/8) with the whole surface thereof smeared out black to a recording blank form. Further, since variable density striations have been generated in the outputted recording blank form, such regulated voltages of respective needle electrodes 12 that are able to moderate variable density striations effectively are obtained by varying the applied voltage of the needle electrodes 12 individually. FIG. 3 is a graph showing the relationship between the position and the regulated voltage of the needle electrode 12 in one group obtained in a manner described above. Besides, the regulated voltage of the respective needle electrodes 12 was measured under the conditions that room temperature is at 70° F. (21° C.) and humidity is 50% RH.

Further, the relationship between the position and the regulated voltage of the needle electrode 12 when the level of the picture image density is varied from 1/8 to 7/8 is obtained in a similar manner to the above. Here, a signal in which a basic pattern with predetermined signals inputted to eight pieces of needle electrodes as one unit is repeated is used as the writing signal $S_W$ so as to write a picture image on the recording blank form. For example, in case the level of the picture image density is 2/8, four types of basic patterns of 00000011, 00000101, 00001001 and 00010001 are used assuming that the ON signal of the writing signal $S_W$ is 1 and the OFF signal thereof is 0. FIG. 6 shows 29 types in total of basic patterns having levels of respective picture image density used in the present embodiment. These 29 types of basic patterns are selected so that pictures of every possible pattern may be expressed by using symmetric property.

It has been found as the result of measurement that the regulated voltage is not affected much by the type of the basic pattern, but that it is enough to take only the picture image density into consideration. This is a subject of measurement accuracy, and the regulated voltage appears to depend on both the arrangement and the picture image density of ON-OFF signal in the writing signal $S_W$. Further, the relationship between the position and the regulated voltage of the needle electrode 12 when the level of the picture image density is 1/8, . . . , 7/8 is almost similar to the graph shown in FIG. 3, and what differs from that graph is a fact that the regulated voltage is lowered as the picture image density gets thinner. Although detailed description is omitted, FIG. 4 shows correction values of the regulated voltage (=the regulated voltage—(−300)) for the picture image density in the needle electrode 12 located at the end of a group. Accordingly, it is generally sufficient to determine the regulated voltage to be applied to respective needle electrodes 12 so that the potential difference between the needle electrodes 12 and the auxiliary electrodes corresponding thereto becomes smaller as getting nearer to both ends at both end portions of the group. Besides, since no voltage is applied to any needle electrodes 12 naturally when the picture image density is zero, it is not necessary to pay attention to the regulated voltage.

Furthermore, since generation of variable density striations is also affected generally by humidity, measurement similar to the above is made after changing the humidity to 30% RH and 60% RH. FIG. 5 shows correction values of the regulated voltage for the picture image density with respect to the needle electrode 12 located at the end of the group when the humidity is varied. It is noticed from FIG. 5 that, when the humidity is 50% RH or 30% RH, big difference is not noticed, but, when the humidity rises to 60% RH, it is required to make the correction value of the regulated voltage a little smaller as compared with the case when the humidity is at 50% RH.

Besides, the reason why the resistances 32 and diodes 34 are provided only at 32 pieces of needle electrodes 12 located at both end portions of the group is that it is sufficient if the applied voltage is regulated with respect to the needle electrodes located at the both end portions of the group from the result of measurement described above. However, when the number of the needle electrodes included in the group is small for instance, it is required to regulate the applied voltage also with respect to the needle electrodes located at a central part of the group, and it is preferred generally to provide the resistance 32 and the diode 34 for all of the needle electrodes. In such a manner, the regulated voltage determining means 44 determines the regulated voltage of each needle electrode 12 corresponding to the picture image density of practically outputted picture image data and the humidity when they are outputted by writing basic patterns having levels of respective picture image densities onto a recording blank form in advance under various humidity environments and based on the regulated voltage of respective needle electrodes 12 obtained so as to moderate variable density striations generated on the recording blank form.

Further, in the present embodiment, resistance values of respective resistances 32 provided at respective 32 pieces of needle electrodes 12 located at both end portions of the group are determined so that desired regulated voltage is applied to respective needle electrodes 12 in the group under certain picture image density and humidity when the voltage of the regulator 42 is set to a predetermined value. With this, it is possible to vary the voltage applied to respective needle electrodes 12 in the group by varying the voltage value of the regulator 42. Here, in the present embodiment, since it is structured so that the regulator 42 is used in common by all the needle electrodes 12, the voltage applied to respective needle electrodes 12 in the group cannot be varied independently of one another when the voltage of the regulator 42 is set to a certain value. As described above, however, the tendency that the correction value of the regulated voltage is increased as getting nearer to both ends at both end portions of the group, and the correction value of the regulated voltage becomes zero at the central part of the group is effected in general. Accordingly, in the applied voltage varying means 30, it is possible to regulate the voltage applied to respective needle electrodes 12 favorably even when the regulator 42 is to be used in common by all the needle electrodes 12 if the resistance values of respective resistances 32 are set as described above, and it is also possible to moderate variable density striations generated on the output blank form in a sufficiently effective manner.

Next, the operation of driving an electrostatic recording head of the present embodiment will be described.

When a picture is written on a recording blank form, first, the matrix circuit 24 transmits the writing signal $S_W$ to the first driving circuit 16, the second driving circuit 18 and the picture image density detecting means 46, and the first driving circuit 16 and the second driving circuit 18 take in the writing signal $S_W$ at a predetermined timing. On the other hand, when the needle electrodes 12 included in a group $G_1$ are driven first for instance, the controller 26 transmits the writing pulse signal $S_{P1}$ to the first driving circuit 16, and also transmits the writing pulse signal $S_{P2}$ for driving two auxiliary electrodes 14$_1$ and 14$_2$ corresponding to the group $G_1$ selectively to the auxiliary electrode driving circuit 22. At this time, the picture image density is detected from the writing signal $S_W$ in the picture image density detecting means 46, and the humidity is detected in the humidity sensor 48, and the regulated voltage determining means 44 determines the regulated voltage with respect to respective needle electrodes 12 in the group in accordance with such picture image density and humidity and sets the voltage value of the regulator 42. Since an electric current is applied to the resistance 32 and the resistance $R_1$ based on the set voltage value and the voltage drops, desired regulated voltage is applied selectively to respective needle electrodes 12 in the odd-numbered groups driven by the first driving circuit 16 corresponding to the writing signal $S_W$ and voltage having a polarity reverse to the needle electrodes is applied to two auxiliary electrodes 14$_1$ and 14$_2$ by means of the auxiliary electrode driving circuit 22. With this, discharge is started with respect to the first group $G_1$ in which voltage is applied both to the needle electrodes 12 and the auxiliary electrodes 14$_1$ and 14$_2$ corresponding to the needle electrodes 12. One line portion of electrostatic latent image is formed on the recording blank form P by performing similar operation with respect to respective groups in a predetermined order such as an order that operation is performed successively starting from a smallest-numbered group with respect to even-numbered groups after performing operation successively starting from a smallest-numbered group with respect to odd-numbered groups.

In an electrostatic recording head of the present embodiment, it becomes possible to regulate the voltage applied to respective needle electrodes individually so that the potential difference between the needle electrodes and the auxiliary electrodes corresponding thereto becomes smaller as getting nearer to both ends at both end portions of respective groups for instance by providing the applied voltage regulating means for regulating the voltage applied to the needle electrodes. With this, since it is possible to form space distribution of an electric field between the needle electrodes and the auxiliary electrodes almost even in respective groups, it is possible to moderate variable density striations generated on the recording blank form effectively. Further, the voltage applied to the needle electrodes is regulated in accordance with the picture image density of picture image data so that picture image data having picture image density which becomes a predetermined reference are written on a recording blank form in advance and variable density striations generated on the recording blank form on which these picture image data have been written are moderated. Therefore, it is possible to regulate the voltage applied to the needle electrodes finely in accordance with the variation of space distribution of an electric field by picture image data, and to moderate the variable density striations more effectively and surely. Furthermore, it becomes possible to regulate the voltage applied to the needle electrodes with a fact that the degree of variable density striations changes depending on humidity also taken into consideration by providing a humidity sensor and regulating the voltage applied to the needle electrodes in accordance with the humidity.

Besides, the present invention is not limited to the above-mentioned embodiment, but variety of modifications are possible within the scope of the gist thereof. For example, a case in which the voltage applied to the needle electrodes is regulated in accordance with picture image density and humidity has been described in the above-mentioned embodiment. However, since environmental temperature and electric characteristics of a recording blank form used are also considered to be the cause of generating variable density striations, it is preferred to regulate the voltage applied to the needle electrodes with these points further taken into consideration. Thus, it becomes possible to regulate the voltage applied to the needle electrodes with a fact that the degree of variable density striations changes depending on temperature also taken into consideration, and it is also possible to regulate the voltage applied to the needle electrodes appropriately even when different types of recording blank forms are used. Furthermore, when an apparatus of the present embodiment is used in a stable environment and so on, the voltage applied to the needle electrodes may be regulated in accordance with only the picture image density without paying attention to humidity or the like.

Further, a case in which an electric current is applied to the resistances $R_1$ provided in the first driving circuit and the second driving circuit and the voltage is dropped by these resistances $R_1$ thereby to regulate the voltage applied to respective needle electrodes by dropping the voltage with these resistances $R_1$ has been described in the above-mentioned embodiment, but it may be arranged so as to regulate the voltage applied to respective needle electrodes by providing resistances discretely in each needle electrode without utilizing the resistances $R_1$ provided in the first driving circuit and the second driving circuit, applying an electric current to these resistances and dropping the voltage.

Furthermore, a case in which the resistance values of respective resistances 32 provided in respective needle electrodes are fixed respectively in the applied voltage varying means 30 has been described in the above-mentioned embodiment, but variable resistance may be adopted for respective resistances 32 of the applied voltage varying means 30. With this, it becomes possible to control the voltage applied to respective needle electrodes independently of one another and finely as well.

In addition, a case in which respective groups and the auxiliary electrodes are arranged by shifting them from one another by half has been described in the above-mentioned embodiment, but the present invention is not limited thereto and respective groups may be arranged oppositely to one auxiliary electrode without shifting respective groups and auxiliary electrodes from one another.

As described above, according to the present invention, it becomes possible to regulate the voltage applied to respective needle electrodes individually so that, for example, the potential difference between the needle electrodes and the auxiliary electrodes corresponding thereto becomes smaller as getting nearer to both ends at both end portions of respective groups by providing the applied voltage regulating means for regulating the voltage applied at least to the needle electrodes located at both end portions in respective groups. With this, since it is possible to form the space distribution of the electric field between the needle electrodes and the auxiliary electrodes almost even in respective groups, it is possible to provide an electrostatic recording head capable of effectively moderating variable density striations generated on a recording medium.

Further, it is possible to provide an electrostatic recording head capable of regulating the voltage applied to the needle electrodes with a simple structure by using an applied voltage regulating means for regulating the voltage applied to the needle electrodes by applying an electric current to the resistance provided in a circuit for applying the voltage to the needle electrodes and dropping the voltage with that resistance.

Further, it is possible to provide an electrostatic recording head capable of surely moderating variable density striations by writing in advance picture image data having picture image density which becomes a predetermined reference and regulating the voltage applied to the needle electrodes so as to moderate variable density striations generated on a recording medium on which these picture image data are written.

Further, since it is possible to regulate the voltage applied to the needle electrodes finely in accordance with the change of the space distribution of the electric field owing to picture image data by regulating the voltage applied to the needle electrodes in accordance with the density of the outputted picture image, it is possible to provide an electrostatic recording head capable of moderating variable density striations generated on the recording medium more effectively.

Furthermore, it is possible to provide an electrostatic recording head capable of regulating the voltage applied to the needle electrodes with a fact that the degree of variable density striations changes depending on humidity taken into consideration by regulating the voltage applied to the needle electrodes in accordance with the humidity.

Furthermore, it is possible to provide an electrostatic recording head capable of regulating the voltage applied to the needle electrodes with a fact that the degree of variable density striations changes depending on temperature also taken into consideration by regulating the voltage applied to the needle electrodes in accordance with the temperature.

In addition, it is possible to provide an electrostatic recording head capable of regulating the voltage applied to the needle electrodes appropriately even when different types of recording media are used by regulating the voltage applied to the needle electrodes in accordance with electric characteristics of the recording media.

What is claimed is:

1. An electrostatic recording head provided with a plurality of needle electrodes, arranged linearly and divided into a plurality of electrode groups such that a position of each needle electrode in each group is fixed during recording, and a plurality of auxiliary electrodes correspondingly arranged adjacent the electrode groups for forming one line portion of an electrostatic latent image on a recording medium by energizing an electrode group in said plurality of electrode groups in a predetermined order based on a writing signal of picture image data, while simultaneously energizing at least one auxiliary electrode corresponding to the energized electrode group, said electrostatic recording head further comprising an applied voltage regulating means for regulating a voltage supplied to at least one needle electrode located at each of both end portions in the electrode group, so that a voltage difference between said needle electrodes in said energized electrode group and said auxiliary electrodes corresponding thereto is smaller at said at least one needle electrode located at each end portion in the energized electrode group while one line portion of said electrostatic latent image is formed, thereby effectively moderating variable density striations on the recording medium.

2. An electrostatic recording head according to claim 1, wherein said applied voltage regulating means includes a plurality of resistors for regulating the voltage applied to said needle electrodes by applying an electric current to said plurality of resistors such that the voltage is dropped across said plurality of resistors.

3. An electrostatic recording head according to claim 1, wherein said applied voltage regulating means regulates the voltage applied to said needle electrodes so that a voltage difference between said needle electrodes and said auxiliary electrodes corresponding thereto becomes smaller toward end portions of each respective group.

4. An electrostatic recording head according to claim 1, wherein said applied voltage regulating means produces a predetermined reference by writing picture image data with picture image density on a recording medium and regulates the voltage applied to said needle electrodes based on said reference so as to moderate variable density striations generated on the recording medium.

5. An electrostatic recording head according to claim 1, further comprising means for detecting density of an outputted picture image, wherein said applied voltage regulating means regulates the voltage applied to said needle electrodes in accordance with the density of the picture image detected by said picture image density detecting means.

6. An electrostatic recording head according to claim 5, wherein said picture image density detecting means determines, based on a writing signal of picture image data, a rate of an ON signal to an OFF signal, thereby detecting the density of the picture image.

7. An electrostatic recording head according to claim 1, further comprising means for detecting humidity, wherein said applied voltage regulating means regulates the voltage applied to said needle electrodes in accordance with the humidity detected by said humidity detecting means.

8. An electrostatic recording head according to claim 1, further comprising means for detecting temperature, wherein said applied voltage regulating means regulates the voltage applied to said needle electrodes in accordance with the temperature detected by said temperature detecting means.

9. An electrostatic recording head according to claim 1, wherein said applied voltage regulating means regulates the voltage applied to said needle electrodes in accordance with electric characteristics of the recording medium.

10. An electrostatic recording head provided with a plurality of needle electrodes, arranged linearly and divided into a plurality of electrode groups such that a position of each needle electrode in each group is fixed during recording, and a plurality of auxiliary electrodes correspondingly arranged adjacent the electrode groups for forming one line portion of an electrostatic latent image on a recording medium by energizing an electrode group in said plurality of electrode groups in a predetermined order based on a writing signal of picture image data, while simultaneously energizing at least one auxiliary electrode corresponding to the energized electrode group, said electrostatic recording head further comprising an applied voltage regulating means for regulating a voltage supplied to at least one needle electrode located at each of both end portions in the electrode group, wherein said applied voltage regulating means includes current resistive means so that when voltage corresponding to the writing signal is supplied to each needle electrode in the electrode group, a voltage difference between the at least one needle electrode located at both end portions of the group and the corresponding auxiliary electrode is smaller, due to a voltage drop in the current resistive means, than a voltage difference between any other needle electrode, disposed at a greater distance from both end portions of the electrode group, and the auxiliary electrode corresponding thereto while one line portion of said electrostatic latent image is formed.

11. An electrostatic recording head for producing an image on a recording medium, comprising:

a plurality of needle electrodes linearly arranged in relation to each other and being perpendicular to a process direction of said recording medium, said plurality of needle electrodes divided into a plurality of established electrode groups such that needle electrodes included in each group are invariably determined and not reestablished during recording;

a plurality of auxiliary electrodes correspondingly located opposite said plurality of established electrode groups, wherein said recording medium is disposed between said plurality of needle electrodes and said plurality of auxiliary electrodes;

at least one driving circuit means for supplying to a selected group in said plurality of established electrode groups a first voltage level of one polarity and for substantially simultaneously supplying to at least one selected auxiliary electrode in said plurality of auxiliary electrodes a second voltage level of the opposite polarity to said first voltage level, thereby causing electric discharge therebetween to produce an electrostatic latent image on said recording medium; and means for controlling said first voltage level supplied to said selected group, said first voltage level being adjusted in accordance with a position of each needle electrode within said selected group, wherein substantially uniform electric field distribution is generated between the needle electrodes of said selected group and said at least one selected auxiliary electrode while one line portion of said electrostatic latent image is formed, for effectively moderating variable density striations produced on said recording medium.

12. The apparatus according to claim 11, further comprising means for detecting a humidity value in an environment surrounding said apparatus, wherein said first voltage level is further adjusted in accordance with said detected humidity value.

13. The apparatus according to claim 11, further comprising means for detecting a temperature value in an environment surrounding said apparatus, wherein said first voltage level is further adjusted in accordance with said detected temperature value.

14. An electrostatic recording head provided with a plurality of needle electrodes, arranged linearly and divided into a plurality of established electrode groups that are not reestablished during recording, and a plurality of auxiliary electrodes correspondingly arranged adjacent the established electrode groups for forming one line portion of an electrostatic latent image on a recording medium by selecting said plurality of established electrode groups successively in a predetermined order and energizing the needle electrodes included in the selected one electrode group and energizing the needle electrodes included in the selected one electrode group based on a writing signal of picture image data, while simultaneously energizing at least one auxiliary electrode corresponding to the selected electrode group, said electrostatic recording head further comprising an applied voltage regulating means for regulating a voltage supplied to at least one needle electrode located at each of both end portions in the selected electrode group, so that a voltage difference between each of said needle electrodes in said selected electrode group and said auxiliary electrodes corresponding thereto is smaller at said one needle electrode located at each end portion in the selected electrode group while one line portion of said electrostatic latent image is formed, thereby effectively moderating variable density striations on the recording medium.

15. An electrostatic recording head provided with a plurality of needle electrodes, arranged linearly and divided into a plurality of established electrode groups, such that needle electrodes included in each group are invariably determined and not re-established during recording, and a plurality of auxiliary electrodes correspondingly arranged adjacent the electrode groups for forming one line portion of an electrostatic latent image on a recording medium by selecting said plurality of electrode groups successively in a predetermined order and energizing the needle electrodes included in the selected one electrode group based on a writing signal of picture image data while simultaneously energizing at least one auxiliary electrode corresponding to the selected electrode group, said electrostatic recording head further comprising an applied voltage regulating means for regulating a voltage supplied to at least one needle electrode located at each of both end portions in the selected electrode group, wherein said applied voltage regulating means includes current resistive means so that when voltage corresponding to the writing signal is supplied to each needle electrode in the selected electrode group, a potential difference between the at least one needle electrode located at each of both end portions of the selected electrode group and the corresponding auxiliary electrode is smaller, due to a voltage drop in the current resistive means, than a voltage difference between any other needle electrode, disposed at a greater distance from both end portions of the selected group, and the auxiliary electrode corresponding thereto.

16. An electrostatic recording head for producing an image on a recording medium, comprising:

- a plurality of needle electrodes divided into a plurality of established electrode groups such that the needle electrodes included in each group are invariably determined and not re-established during recording;
- a plurality of auxiliary electrodes correspondingly located opposite said plurality of electrode groups wherein said recording medium is disposed between said plurality of needle electrodes and said plurality of auxiliary electrodes;
- at least one driving circuit means for selecting said plurality of electrode groups successively in a predetermined order and supplying to the selected electrode group a first voltage level of one polarity and for substantially simultaneously supplying to at least one selected auxiliary voltage level of an opposite polarity to said first voltage level, thereby causing electric discharge therebetween to produce an electrostatic latent image on said recording medium;

means for controlling said first voltage level supplied to said selected group, said first voltage level being adjusted in accordance with a position of each needle electrode within said selected group, wherein substantially uniform electric field distribution is generated between the needle electrodes of said selected electrode group and said at least one selected auxiliary electrode for effectively moderating variable density striations produced on said recording medium.

* * * * *